United States Patent
Reece

[11] Patent Number: 6,116,691
[45] Date of Patent: Sep. 12, 2000

[54] HEAD SUPPORT PILLOW

[76] Inventor: Jennifer S. Reece, 19034 FM 1778, Nevada, Tex. 75173

[21] Appl. No.: 09/481,636

[22] Filed: Jan. 12, 2000

[51] Int. Cl.[7] .............................. A47G 9/00; A47D 15/00
[52] U.S. Cl. .............................. 297/392; 297/397; 5/636; 5/637
[58] Field of Search .................................. 297/391, 392, 297/397, 464; 5/636, 637, 640, 643

[56] References Cited

U.S. PATENT DOCUMENTS

| | | | |
|---|---|---|---|
| 4,285,081 | 8/1981 | Price ............................................. | 5/637 |
| 4,617,691 | 10/1986 | Monti et al. ................................. | 5/640 |
| 5,330,255 | 7/1994 | Stawicki .............................. | 297/397 X |
| 5,486,037 | 1/1996 | Harper ................................... | 297/397 |
| 5,505,523 | 4/1996 | Wang ..................................... | 297/393 |
| 5,544,378 | 8/1996 | Chow ......................................... | 5/644 |
| 5,580,133 | 12/1996 | Knox et al. ......................... | 297/397 X |
| 5,586,351 | 12/1996 | Ive ............................................. | 5/655 |
| 5,630,651 | 5/1997 | Fishbane ................................ | 297/397 |
| 5,735,576 | 4/1998 | Pepys et al. ............................ | 297/397 |
| 5,778,469 | 7/1998 | Festa .................................. | 297/408 X |

*Primary Examiner*—Peter R. Brown
*Attorney, Agent, or Firm*—Joseph N. Breaux

[57] ABSTRACT

A head support pillow formed of a visco-elastic foam that is securable to a car seat, baby carrier, or the like that includes a number of support surfaces for maintaining the head of a user in an upright position by providing support to the back of the head, the left and right sides of the head and the chin. The head support pillow also includes a cervical support portion for supporting the cervical spine in a comfortable position.

1 Claim, 4 Drawing Sheets

HEAD SUPPORT PILLOW

TECHNICAL FIELD

The present invention relates to pillows and the like and more particularly to a head support pillow that includes a cushion portion formed out of visco-elastic foam, a launderable fabric cover member detachably securable about the cushion portion, two attachment straps each having a first end secured to the cushion portion and a second end provided with a strap section of hook and pile fastener material, and two adhesive backed sections of hook and pile material companionate with each strap section of hook and pile faster material provided on the second end of each attachment strap; the cushion portion including a neck receiving passage defined therethrough into which a neck of a user is laterally positioned through a neck insertion gap defined between spaced left and right retaining structures; a top portion of the neck receiving passage being defined by a curved head contact surface that is concave between a cushion top surface and a jaw/head support portion extending between the left and right retaining structures; the width of the neck insertion gap measuring less than the width of the neck receiving passage; the cushion portion further including a cervical spine support portion extending from a bottom center of the jaw/head support portion; the spaced left and right retaining structures each having an upper surface defining a left and a right indentation portion, respectively, of a front chin passage indentation formed into a front side of the cushion portion; a center indentation portion of the front chin passage indentation being positioned above the neck insertion gap.

BACKGROUND ART

Sick and injured individuals as well as small children, particularly infants, can be worn out when seated in a chair, traveling in a car seat, or the like just by the exertion required to keep the head in an upright position. It would be a benefit, therefore, to have a head support pillow formed of a visco-elastic foam that could be secured to a car seat, baby carrier, or the like that included a number of support surfaces for maintaining the head of a user in an upright position by providing support to the back of the head, the left and right sides of the head and the chin. Because incorrect positioning can cause strain on the cervical spine (neck) it would be further benefit to have such as pillow that further included a cervical support portion.

General Summary Discussion of Invention

It is thus an object of the invention to provide a head support pillow that includes a cushion portion formed out of visco-elastic foam, a launderable fabric cover member detachably securable about the cushion portion, two attachment straps each having a first end secured to the cushion portion and a second end provided with a strap section of hook and pile fastener material, and two adhesive backed sections of hook and pile material companionate with each strap section of hook and pile faster material provided on the second end of each attachment strap; the cushion portion including a neck receiving passage defined therethrough into which a neck of a user is laterally positioned through a neck insertion gap defined between spaced left and right retaining structures; a top portion of the neck receiving passage being defined by a curved head contact surface that is concave between a cushion top surface and a jaw/head support portion extending between the left and right retaining structures; the width of the neck insertion gap -measuring less than the width of the neck receiving passage; the cushion portion further including a cervical spine support portion extending from a bottom center of the jaw/head support portion; the spaced left and right retaining structures each having an upper surface defining a Left and a right indentation portion, respectively, of a front chin passage indentation formed into a front side of the cushion portion; a center indentation portion of the front chin passage indentation being positioned above the neck insertion gap.

Accordingly, a head support pillow is provided. The head support pillow includes a cushion portion formed out of visco-elastic foam, a launderable fabric cover member detachably securable about the cushion portion, two attachment straps each having a first end secured to the cushion portion and a second end provided with a strap section of hook and pile fastener material, and two adhesive backed sections of hook and pile material companionate with each strap section of hook and pile faster material provided on the second end of each attachment strap; the cushion portion including a neck receiving passage defined therethrough into which a neck of a user is laterally positioned through a neck insertion gap defined between spaced left and right retaining structures; a top portion of the neck receiving passage being defined by a curved head contact surface that is concave between a cushion top surface and a jaw/head support portion extending between the left and right retaining structures; the width of the neck insertion gap measuring less than the width of the neck receiving passage; the cushion portion further including a cervical spine support portion extending from a bottom center of the jaw/head support portion; the spaced left and right retaining structures each having an upper surface defining a left and a right indentation portion, respectively, of a front chin passage indentation formed into a front side of the cushion portion; a center indentation portion of the front chin passage indentation being positioned above the neck insertion gap.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figures 1, 2:
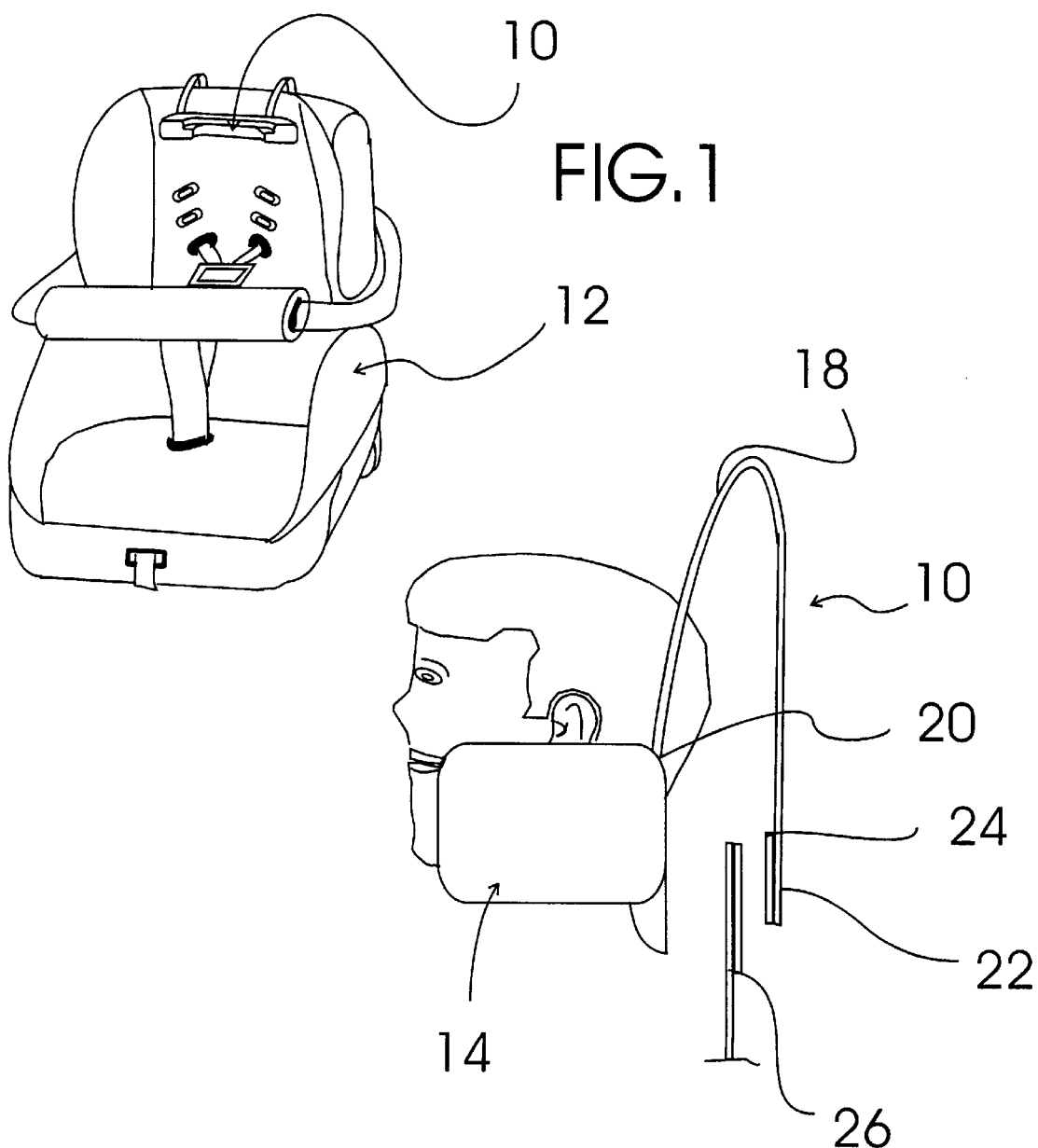
FIG. 1 is a perspective view showing a representative child car seat with an exemplary embodiment of the head support pillow installed.
FIG. 2 is a side plan view of the exemplary head support pillow of FIG. 1 with the head of a user positioned between the left and right support structures.
Figure 4:
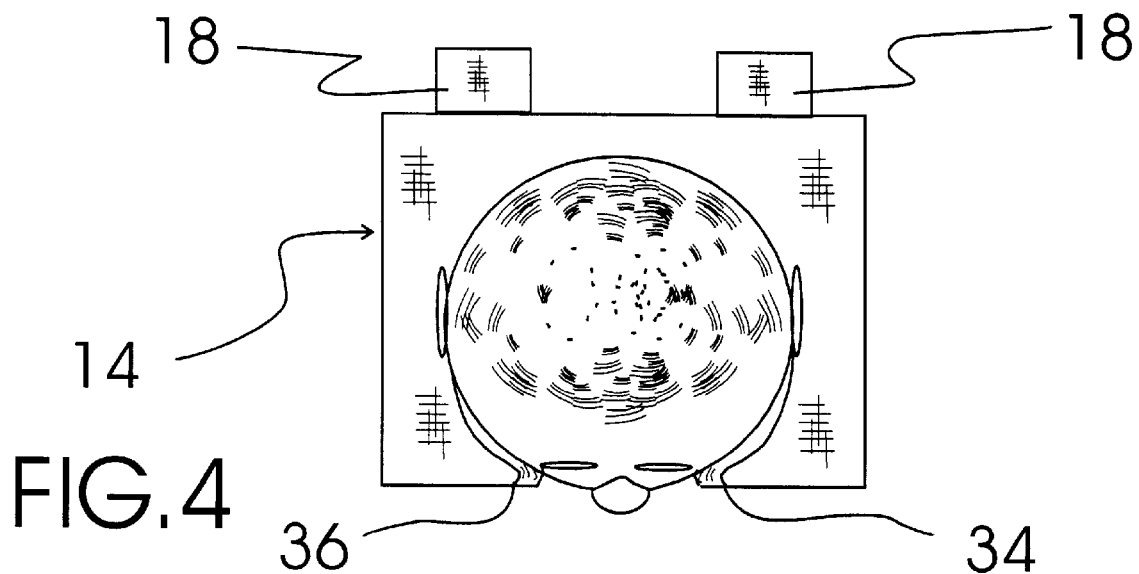
FIG. 4 is a top plan view showing the exemplary head support pillow of FIG. 1 with the head of a representative infant supported thereon.
Figure 3:
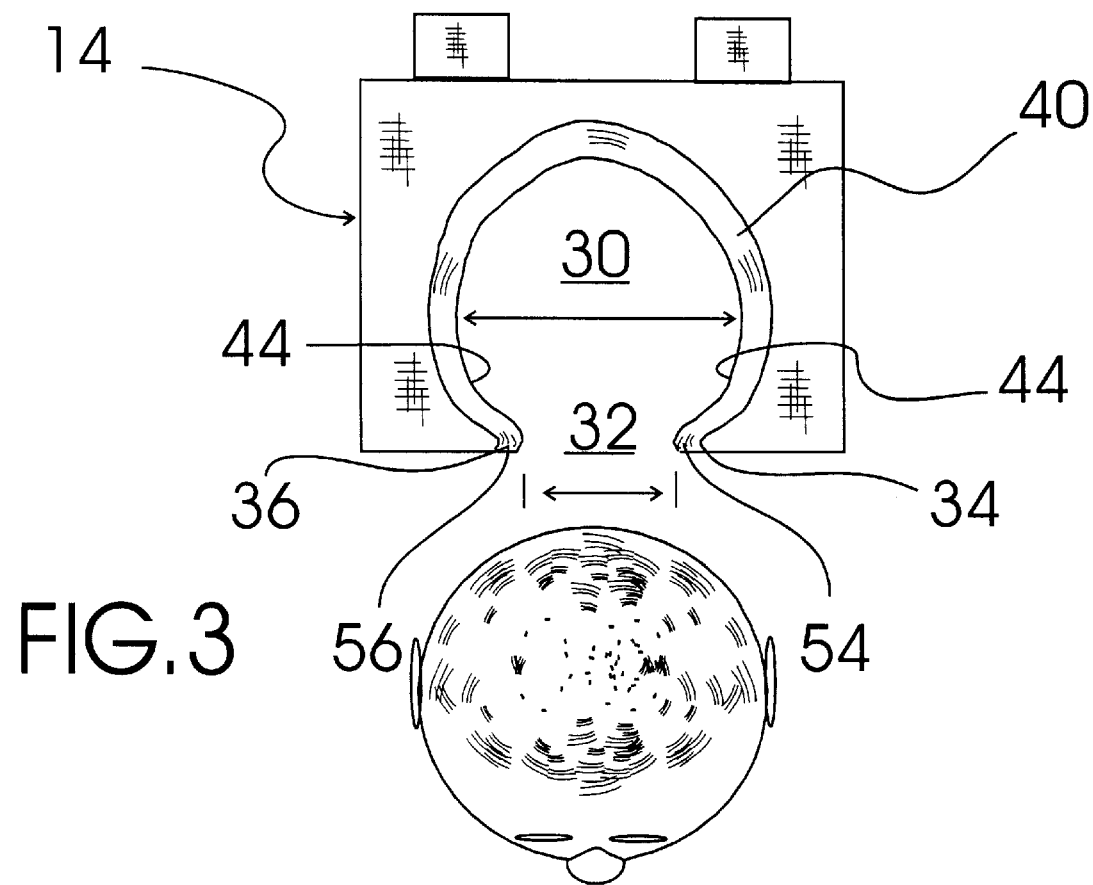
FIG. 3 is an exploded top plan view showing the exemplary head support pillow of FIG. 1 with the head of a representative infant about to be positioned between the left and right retaining structures.
Figure 5:
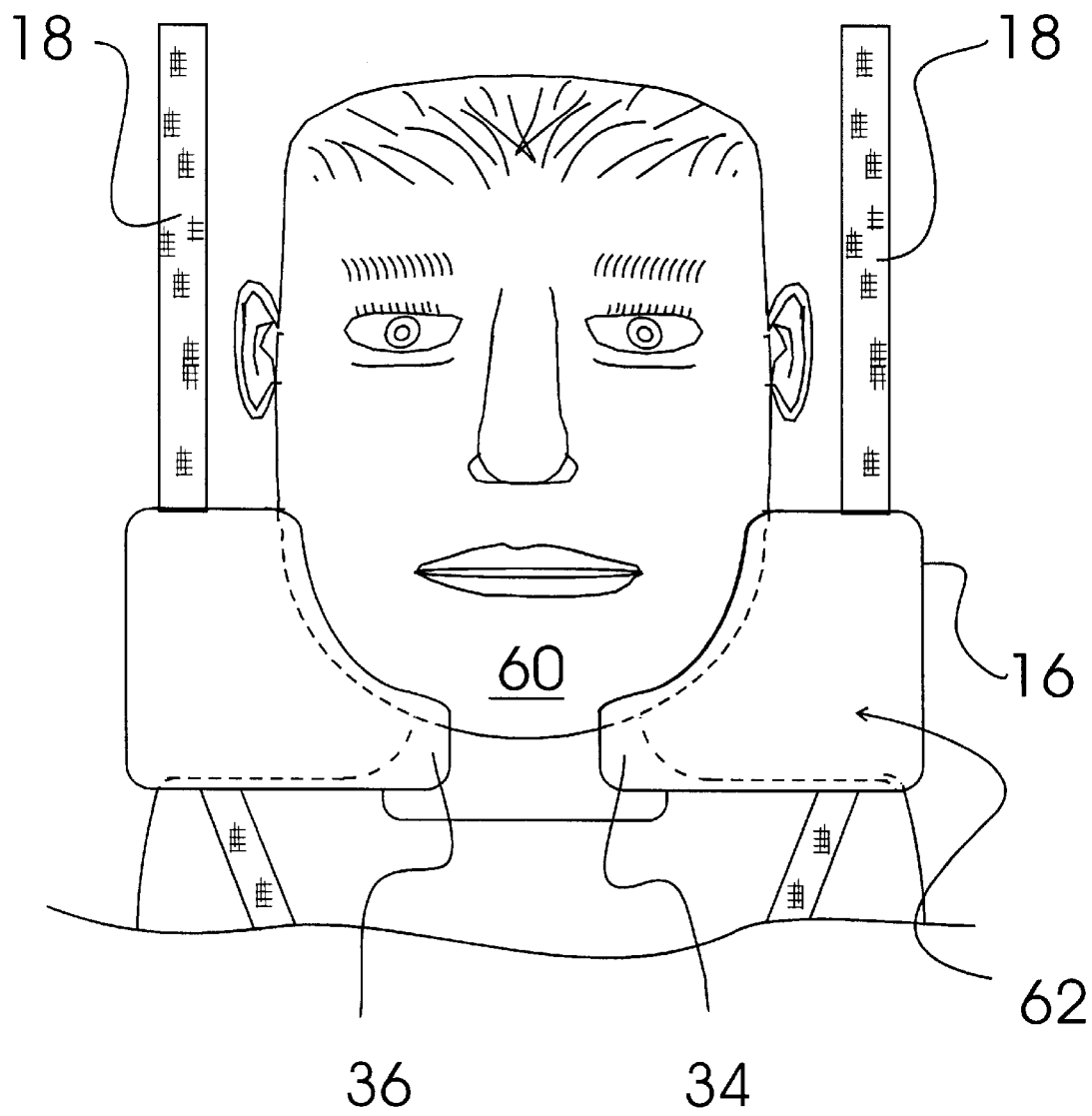
FIG. 5 is a front plan view of the exemplary head support pillow with the head of a representative child positioned through the neck insertion gap defined between the left and right retaining structures and the launderable fabric cover member detachably secured about the cushion portion.
Figure 6:
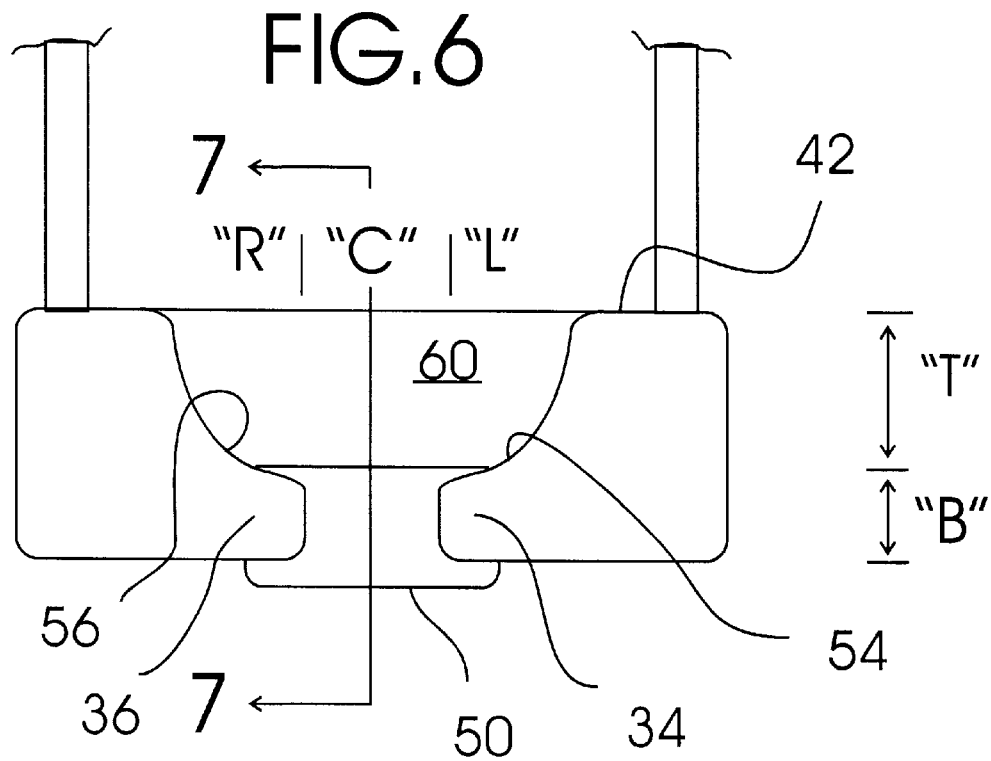
FIG. 6 is a front plan view of the exemplary head support pillow.

FIG. 1 shows a exemplary embodiment of the head support pillow of the present invention, generally designated 10, installed on a representative child car seat 12. With general reference now also to FIGS. 2–6, head support pillow 10 includes a cushion portion, generally designated 14, formed out of visco-elastic foam, a launderable fabric cover member 16 detachably securable about cushion portion 14, two attachment straps 18 each having a first end 20 secured to cushion portion 14 and a second end 22 provided with a strap section 24 of hook and pile fastener material, and two adhesive backed sections 26 of hook and pile material companionate with each strap section 24 of hook and pile faster material provided on second end 22 of each attachment strap 18.

Cushion portion 14 includes a neck receiving passage 30 defined therethrough into which a neck of a user is laterally positioned through a neck insertion gap 32 defined between spaced left and right retaining structures 34,36. A top portion (designated "T" (FIG. 6) of neck receiving passage 30 is defined by a curved head contact surface 40 that is concave between a cushion top surface 42 and a jaw/head support portion 44 extending between left and right retaining structures 34,36. The width of neck insertion gap 32 measures less than width of neck receiving passage 30.

Cushion portion 14 also includes a cervical spine support portion 50 extending from a bottom center of jaw/head support portion 44. Left and right retaining structures 34,36 each have an upper surface 54,56 defining a left "L" and a right "R" indentation portion, respectively, of a front chin passage indentation 60 formed into a front side, generally designated 62, of cushion portion 14. A center "C" indentation portion of front chin passage indentation 60 is positioned above neck insertion gap 32.

Figure 7:
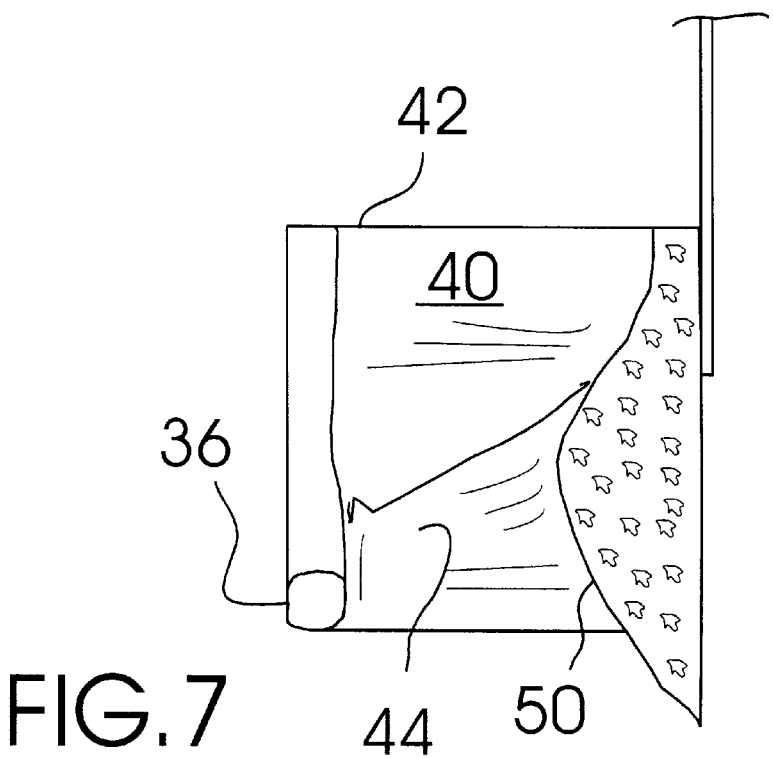
FIG. 7 is a section view of the head support pillow through the line 6—6 of FIG. 6

In use the two adhesive backed sections 26 of hook and pile material are adhesively secured to the back of a chair, car seat, baby carrier or the like. Cushion portion 14 is then placed at the desired height and the strap sections 24 of hook and pile fastener material are secured to adhesive backed sections 26 to support cushion portion 14 at the desired height. When the person sits down, the neck of the user is forced through neck insertion gap 32 into neck receiving passage 30 such that the chin of the user is positioned through the front chin passage indentation 60 and supported by left and right retaining structures 34,36, the head of the user is supported by curved head contact surface 40, FIG. 7, and jaw/head support portion 44, and the back portion of the neck of the user is supported by cervical spine support portion 50. With the head and neck thus supported, it can be seen that head support pillow 10 can minimize traumatic injury to the neck and head of a child positioned in a car seat or an adult positioned in a vehicle seat.

It can be seen from the preceding description that a head support pillow has been provided that includes a cushion portion formed out of visco-elastic foam, a launderable fabric cover member detachably securable about the cushion portion, two attachment straps each having a first end secured to the cushion portion and a second end provided with a strap section of hook and pile fastener material, and two adhesive backed sections of hook and pile material companionate with each strap section of hook and pile faster material provided on the second end of each attachment strap; the cushion portion including a neck receiving passage defined therethrough into which a neck of a user is laterally positioned through a neck insertion gap defined between spaced left and right retaining structures; a top portion of the neck receiving passage being defined by a curved head contact surface that is concave between a cushion top surface and a jaw/head support portion extending between the left and right retaining structures; the width of the neck insertion gap measuring less than the width of the neck receiving passage; the cushion portion further including a cervical spine support portion extending from a bottom center of the jaw/head support portion; the spaced left and right retaining structures each having an upper surface defining a left and a right indentation portion, respectively, of a front chin passage indentation formed into a front side of the cushion portion; a center indentation portion of the front chin passage indentation being positioned above the neck insertion gap.

It is noted that the embodiment of the head support pillow described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A head support pillow comprising:

a cushion portion formed out of visco-elastic foam;

a launderable fabric cover member detachably securable about said cushion portion;

two attachment straps each having a first end secured to said cushion portion and a second end provided with a strap section of hook and pile fastener material; and two adhesive backed sections of hook and pile material companionate with each strap section of hook and pile faster material provided on said second end of each attachment strap;

said cushion portion including a neck receiving passage defined therethrough into which a neck of a user is laterally positioned through a neck insertion gap defined between spaced left and right retaining structures;

a top portion of said neck receiving passage being defined by a curved head contact surface that is concave between a cushion top surface and a jaw/head support portion extending between said left and right retaining structures;

said width of said neck insertion gap measuring less than said width of said neck receiving passage;

said cushion portion further including a cervical spine support portion extending from a bottom center of said jaw/head support portion;

said spaced left and right retaining structures each having an upper surface defining a left and a right indentation portion, respectively, of a front chin passage indentation formed into a front side of said cushion portion;

a center indentation portion of said front chin passage indentation being positioned above said neck insertion gap.

* * * * *